(12) United States Patent
Roedseth et al.

(10) Patent No.: US 7,288,160 B2
(45) Date of Patent: Oct. 30, 2007

(54) METHOD OF MAKING A TIRE USING A HIGH CROWN UNI-STAGE TIRE BUILDING DRUM

(75) Inventors: John Kolbjoern Roedseth, Bissen (LU); Francis Omer Elie Cornet, Habay-la-Vieille (BE); Jean-Marie Emilien Gabriel Colling, Marbehan (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 120 days.

(21) Appl. No.: 11/020,366

(22) Filed: Dec. 23, 2004

(65) Prior Publication Data

US 2006/0137806 A1 Jun. 29, 2006

(51) Int. Cl.
*B29D 30/32* (2006.01)
(52) U.S. Cl. ............... 156/132; 156/131; 156/135; 156/415
(58) Field of Classification Search ........ 156/131–133, 156/135, 400–403, 415; 152/DIG. 6
See application file for complete search history.

(56) References Cited

U.S. PATENT DOCUMENTS

| | | | | |
|---|---|---|---|---|
| 3,698,987 A | * | 10/1972 | Woodhall et al. | 156/401 |
| 3,795,564 A | | 3/1974 | Mallory | 156/417 |
| 3,816,218 A | | 6/1974 | Felten | 156/398 |
| 4,010,058 A | * | 3/1977 | Kubinski et al. | 156/415 |
| 4,214,939 A | | 7/1980 | Enders | 156/398 |
| 4,239,579 A | | 12/1980 | Felten et al. | 156/398 |
| 4,349,406 A | | 9/1982 | Stalter et al. | 156/416 |
| 4,780,170 A | * | 10/1988 | Landsness | 156/416 |
| 4,933,034 A | | 6/1990 | Kokubu et al. | 156/136 |
| 5,268,057 A | | 12/1993 | Nojiri et al. | 156/415 |
| 5,301,728 A | * | 4/1994 | Brown et al. | 152/209.14 |
| 5,785,781 A | * | 7/1998 | Drieux et al. | 152/454 |
| 6,250,356 B1 | | 6/2001 | Cordaillat et al. | 156/400 |
| 6,318,434 B1 | | 11/2001 | Gutknecht et al. | 156/402 |
| 6,360,802 B1 | * | 3/2002 | Baldoni et al. | 156/415 |
| 6,585,022 B1 | | 7/2003 | Rex | 156/401 |
| 6,723,195 B1 | | 4/2004 | Felten | 156/133 |
| 6,758,930 B1 | | 7/2004 | Felten | 156/111 |
| 6,769,468 B2 | | 8/2004 | Currie et al. | 156/398 |
| 7,152,649 B2 | * | 12/2006 | Sala | 156/402 |
| 2005/0028920 A1 | * | 2/2005 | Roedseth et al. | 156/132 |

FOREIGN PATENT DOCUMENTS

| | | |
|---|---|---|
| DE | 27 05 504 | 8/1978 |
| EP | 1 295 704 | 3/2003 |
| EP | 1 504 883 | 2/2005 |
| WO | WO-01/08874 A1 * | 2/2001 |

OTHER PUBLICATIONS

European Search Report, completed Apr. 7, 2006.

* cited by examiner

*Primary Examiner*—Geoffrey L. Knable
(74) *Attorney, Agent, or Firm*—June E. Rickey

(57) ABSTRACT

A tire building drum and a method of building a tire carcass is disclosed. The tire building drum has a center section comprised of a plurality of segments that are radially and axially movable. The building drum further comprises shoulder sections that are axially movable. The shoulder sections include radially expandable bead locks. The method employs the steps of applying one or more carcass layers, locking the bead locks and moving the center section radially outwardly while moving the bead locks axially inwardly.

12 Claims, 14 Drawing Sheets

METHOD OF MAKING A TIRE USING A HIGH CROWN UNI-STAGE TIRE BUILDING DRUM

FIELD OF THE INVENTION

The invention relates to a tire building drum, more particularly to a tire building drum having a high central crown region.

BACKGROUND OF THE INVENTION

The manufacture of tires typically involves a tire building drum wherein numerous tire components are applied to the drum in sequence, forming a cylindrical shaped tire carcass. This stage of the tire building process is commonly referred to as the "first stage" of the tire building process. The tire carcass is then typically removed from the tire building drum and sent to a second stage, expandable tire shaping drum where the carcass is expanded into a toroidal shape for receipt of the remaining components of the tire such as the belt package and a rubber tread. The completed toroidal shape unvulcanized tire carcass or green tire is then removed from the second stage drum and subsequently molded and vulcanized into a finished tire.

The prior art process thus requires two tire building drums and the transfer of the carcass from one drum to the other. Further, a problem often arises in precisely locating and anchoring the tire beads on the unvulcanized tire carcass, especially during the transportation of the tire beads from the first stage drum to the second stage drum. Variations in bead positioning can result in ply distortion in the tire.

Tire manufacturers have recently begun moving towards the utilization of a single tire building drum, for both the first and second stage tire building. This requires that the tire building drum be capable of axial expansion and contraction as well as radial expansion/contraction. Further, it is important to maintain a positive bead lock during the entire tire building process, including the tire shaping, so that the ply cord length is maintained, resulting in good tire uniformity. Due to the fact that the tire building drum axially and radially expands, it is important that both sides of the tire building drum move in synchronization. If one side of the drum is out of synchronization with the other side of the drum, problems in tire uniformity can occur. It is additionally desired to support the apex and bead assembly in a vertical manner while avoiding unwanted displacements of the tire components, particularly the ply.

SUMMARY OF THE INVENTION

The invention provides in a first aspect a method of building a tire carcass on a tire building drum. The steps include applying one or more tire building components onto a drum to form a cylindrically shaped unvulcanized tire carcass having carcass ends; placing a first and second bead around the tire building components on the drum so that the carcass ends of the tire carcass extend laterally between the beads; radially expanding a first and second bead lock mechanism into engagement with a first and second bead; moving the carcass located between the bead locks radially outward by radially expanding a center portion of the tire building drum while moving the pair of bead lock mechanisms axially inward.

The invention provides in a second aspect a method of building a tire carcass on a tire building drum comprising the steps of: applying one or more tire building components onto a drum to form a cylindrically shaped unvulcanized tire carcass having carcass ends; placing a first and second bead around the tire building components on the drum so that the carcass ends of the tire carcass extend laterally between the beads; radially expanding a first and second bead lock mechanism into engagement with a first and second bead; expanding the carcass located between the bead locks radially outward by radially expanding a center portion of the tire building drum while maintaining the axial tension of the carcass located between the bead locks.

DEFINITIONS

For ease of understanding this disclosure, the following items are defined:

"Apex" means an elastomeric filler located radially above the bead and interposed between the plies and the ply turn-up.

"Axial" and "axially" means the lines or directions that are parallel or aligned with the longitudinal axis of rotation of the tire building drum.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire building drum.

"Radial Ply Tire" means a belted or circumferentially restricted pneumatic tire in which at least one layer of ply has the ply cords extend from bead to bead at cord angles between 65° and 90° with respect to the equatorial plane of the tire.

"Shoulder" means the upper portion of sidewall just below the tread edge.

"Sidewall" means that portion of a tire between the tread and the bead.

"Tread" means a rubber component which when bonded to a tire carcass includes that portion of the tire that come into contact with the road when the tire is normally inflated and under normal load.

"Tread Width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which.

DETAILED DESCRIPTION OF THE INVENTION

Figure 1A:
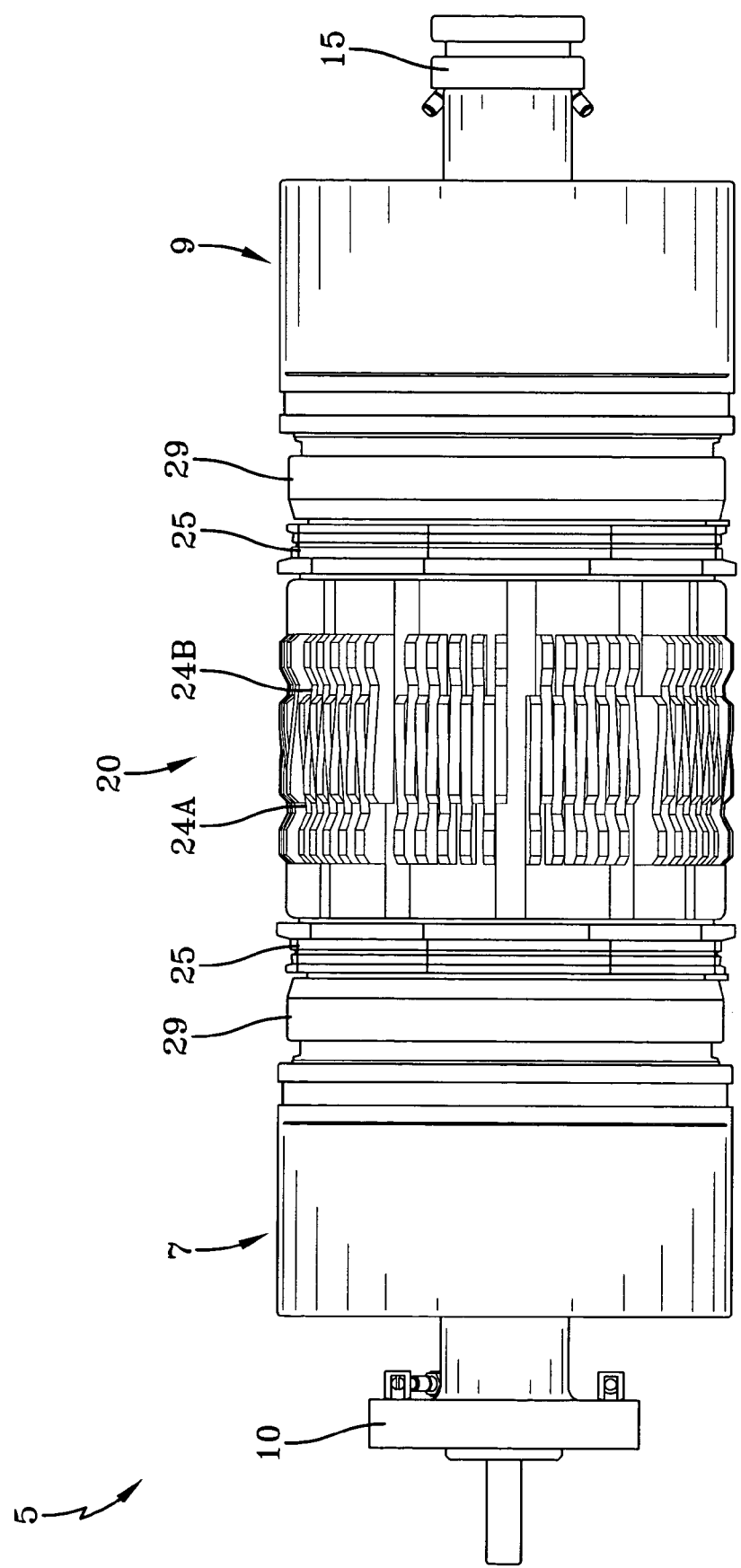
FIGS. 1A and 1B are perspective side views of a tire building drum shown in the start position and the high crown (radially expanded) position.

With reference to FIGS. 1 through 5, an exemplary tire building drum 5 of the present invention is illustrated. As shown more particularly in FIGS. 1A and 1B, the tire building drum 5 has a left hand side 7 and a right hand side 9 joined together by a center section 20. The center section is further divided into a right hand side and a left hand side, which are both axially and radially movable, as described in more detail, below. Adjacent the center section 20 are first and second bead locking mechanisms 25, which are also radially movable as shown in FIG. 1B. Adjacent the bead locking mechanisms are first and second shoulder segments 29. Both the bead locking mechanisms and the shoulder segments are axially movable. Thus, both the left hand side and the right hand side of the drum are axially movable. These components are described in more detail, below.

Center Section

Figure 14A:
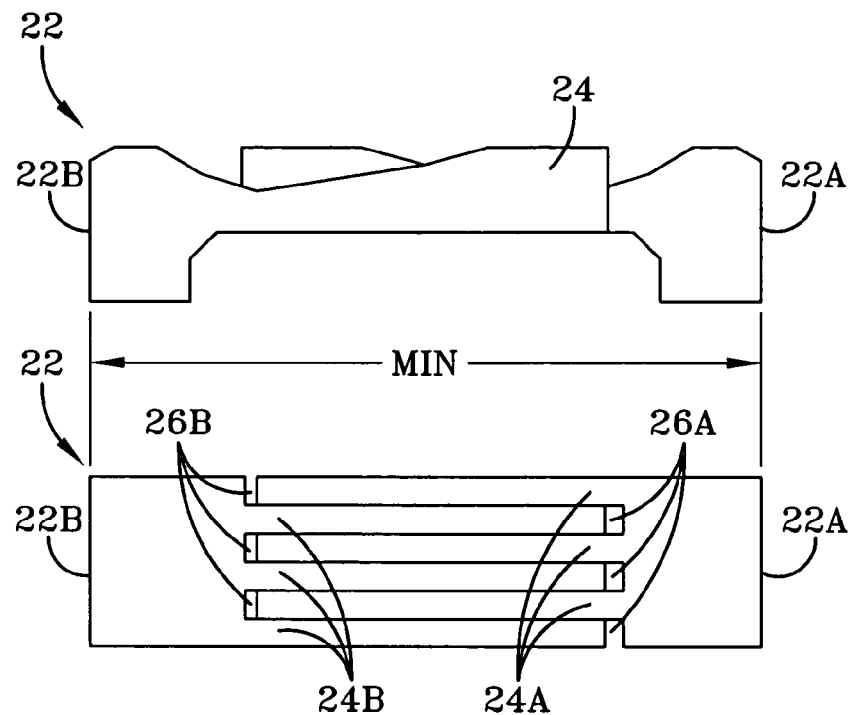
FIGS. 14A and 14B are top, side views of the center segments shown in the axially collapsed position and the axially expanded position, respectively.
Figure 14B:
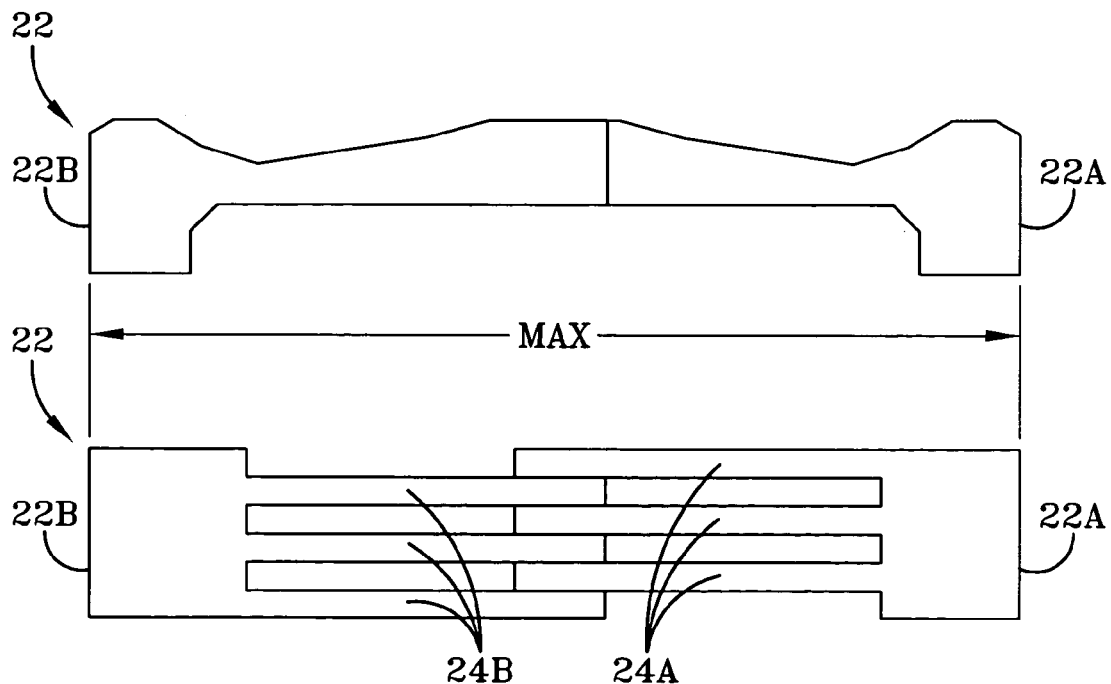
Figure 15:
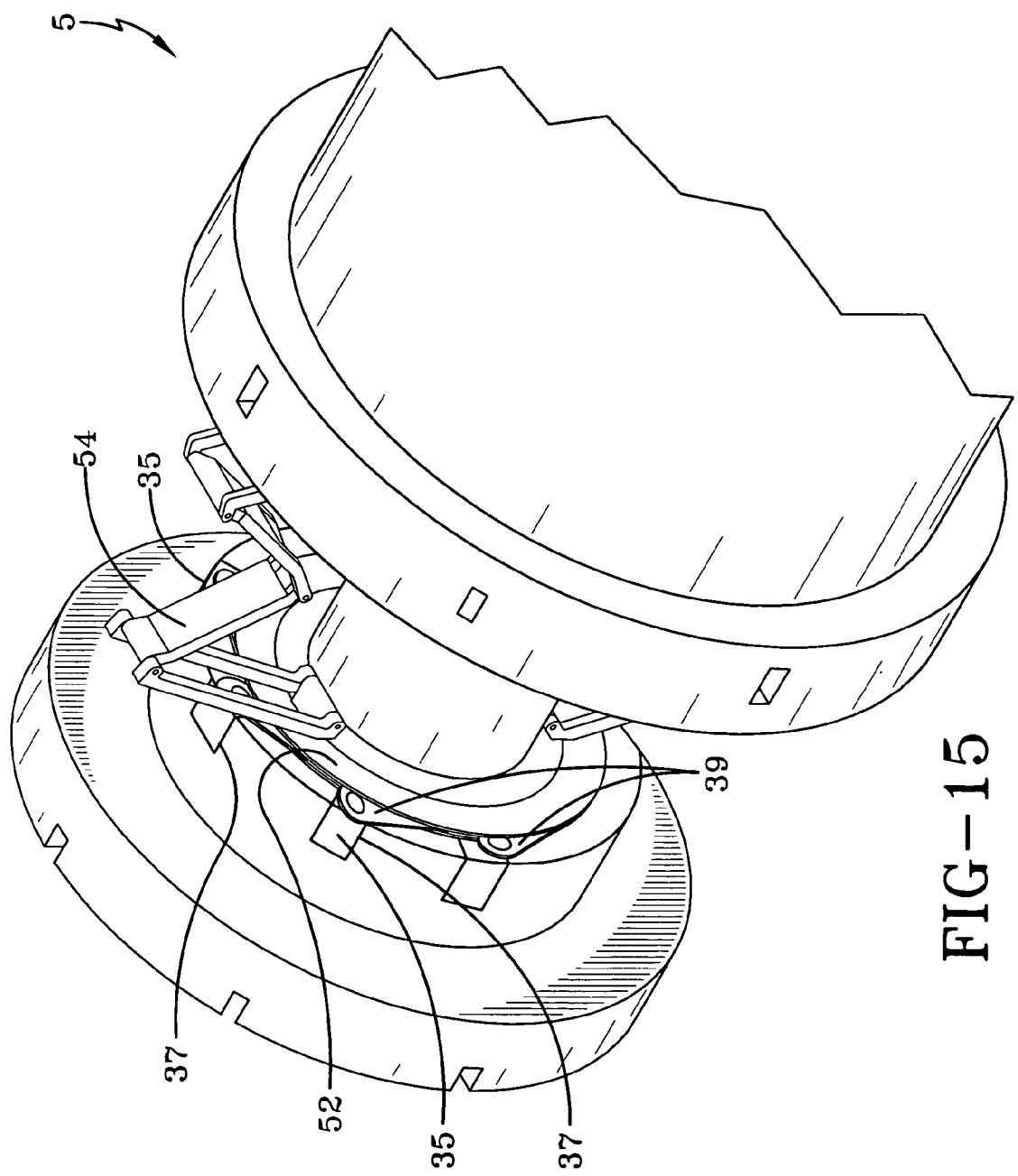
FIGS. 15 and 16 are cutaway perspective views of the tire building drum with the center segments removed, and showing the center synchronization mechanism and the lifter arms in the retracted and the radially outer position, respectively.
Figure 16:
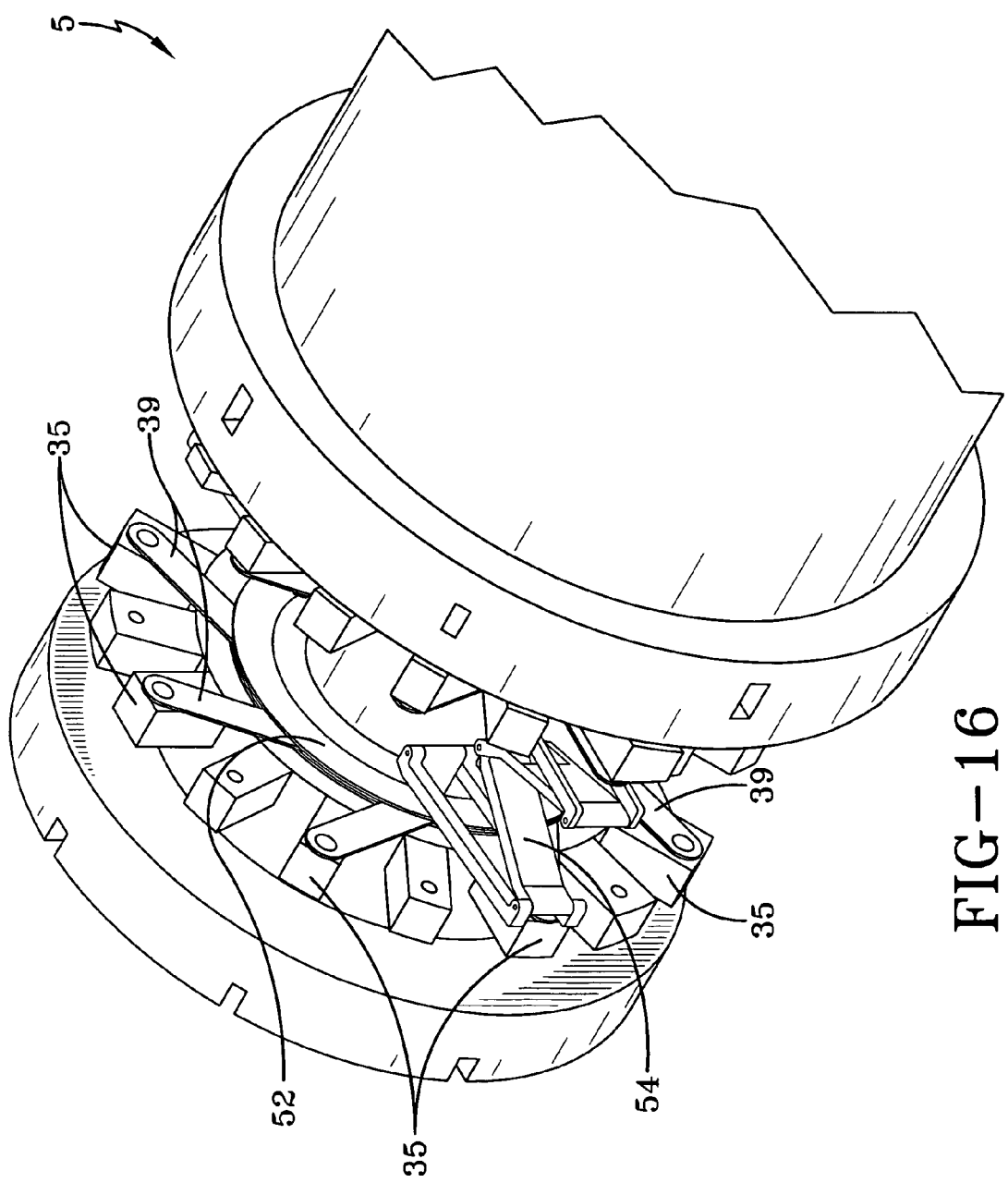

The center section 20 of the tire building drum further comprises a plurality of center segments 22 located about the outer circumference of the drum. Each of the center segments are split into a left hand side 22a and a right hand side 22b, as shown in FIG. 14. Each side 22a, 22b has one or more finger-like projections 24 which are slidably received in one or more opposed recesses 26 in an interdigitated or interlocked manner. The center segments 22 can thus axially expand or contract as the fingers slide within the recesses.

Figure 1B:
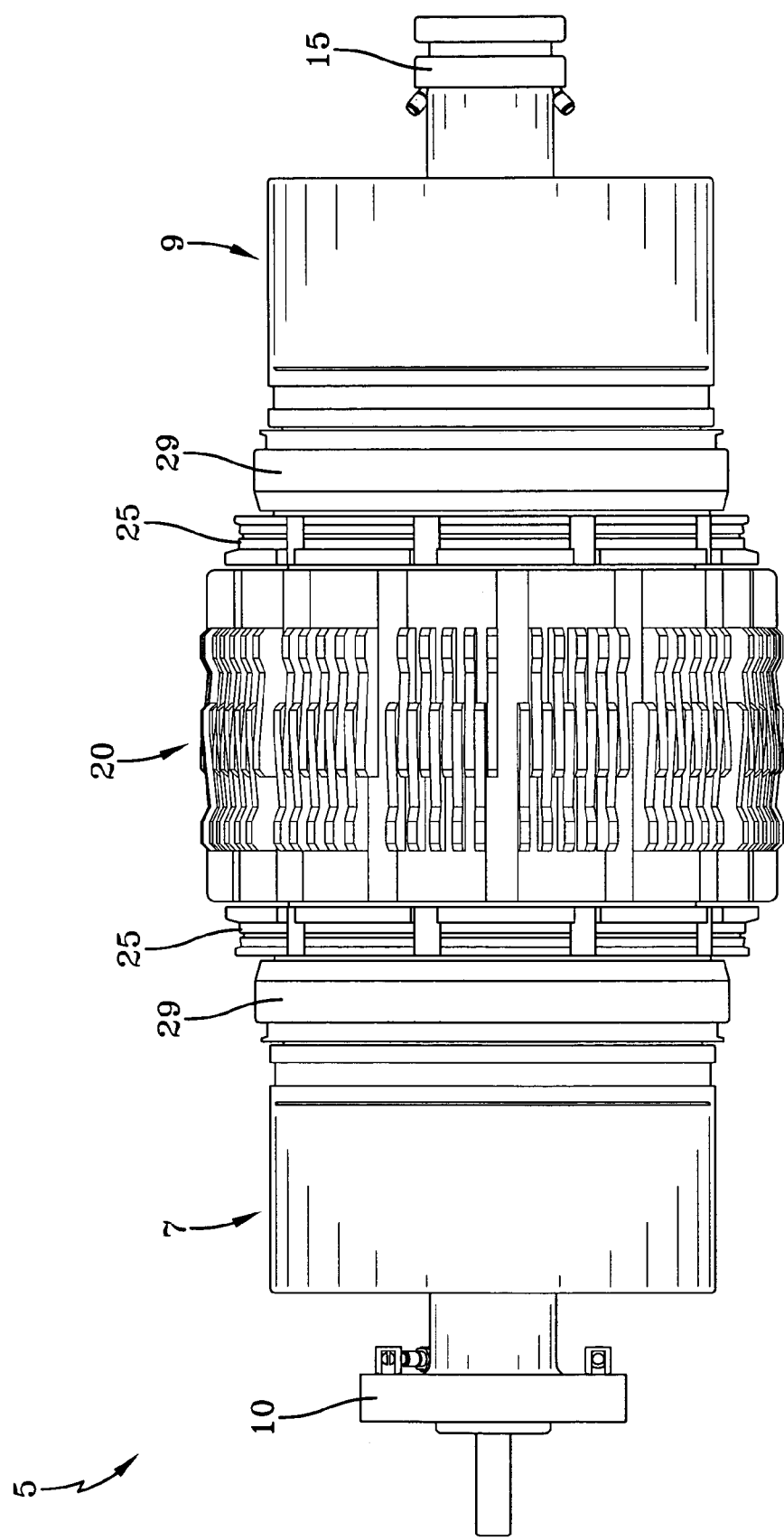
Figure 3:
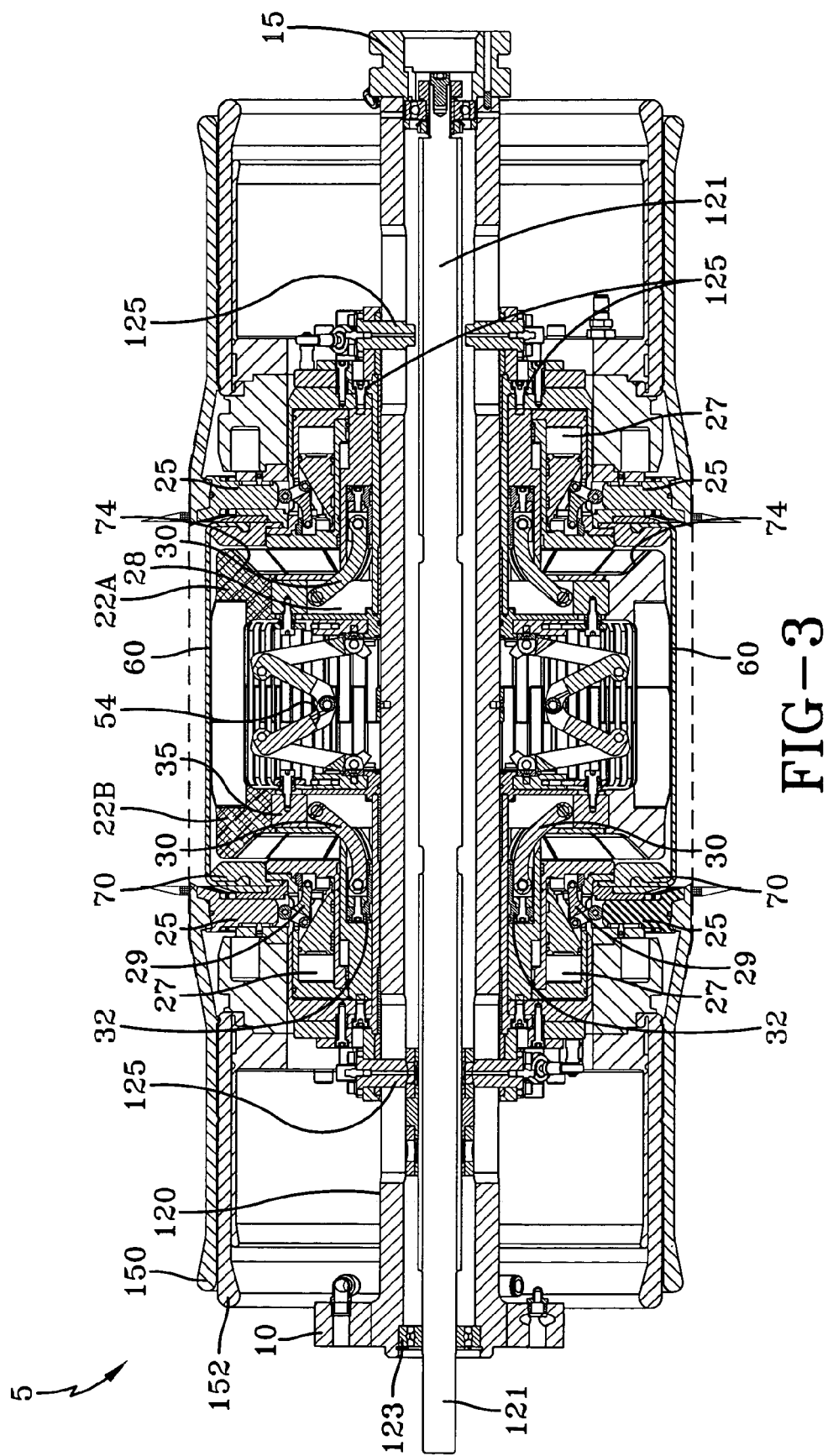
FIG. 3 is a cross-sectional view of the tire building drum shown in the bead lock position.
Figure 4:
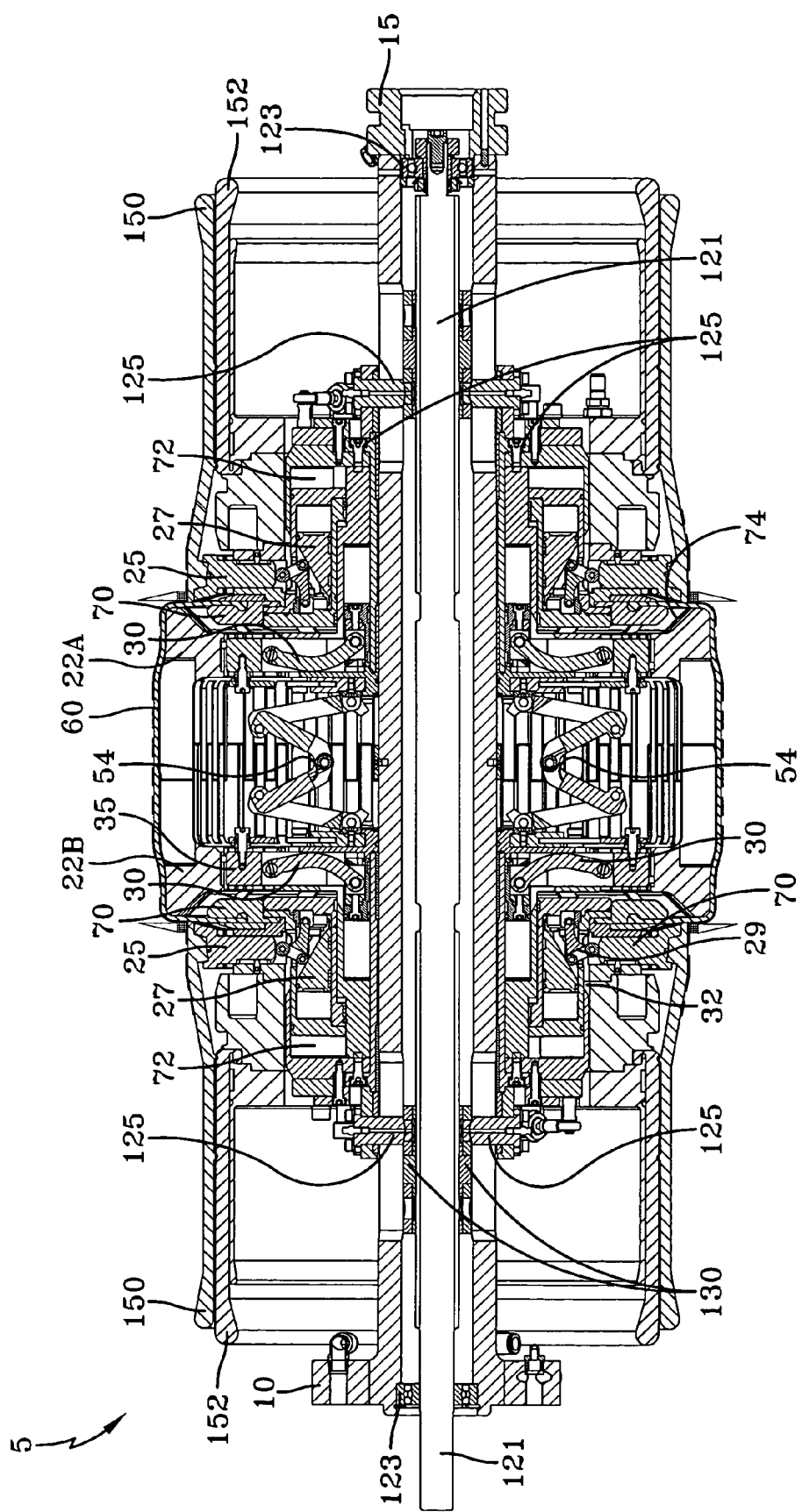
FIG. 4 is a cross-sectional view of the tire building drum in the expanded high crown condition.
Figure 5:
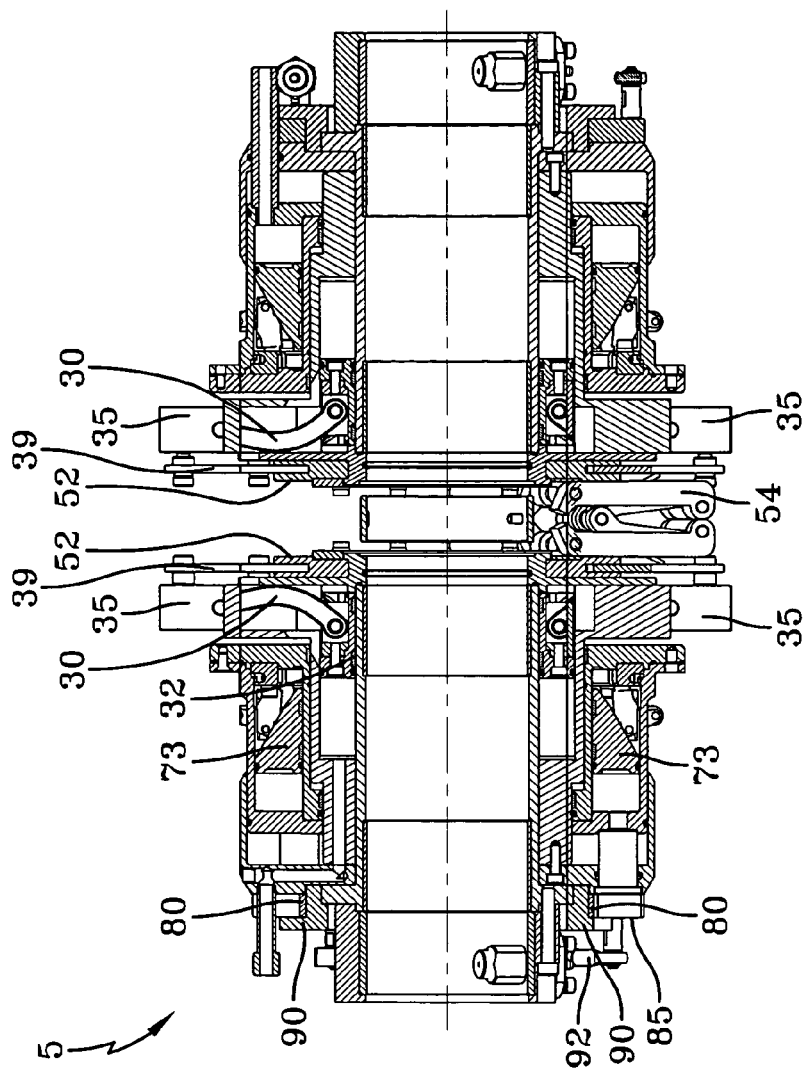
FIG. 5 is a cross sectional view of the tire building drum showing the stop pin locked in the outside position.

The center section 20 may also radially expand as shown in FIGS. 1b and 4. The center section 20 can radially expand in the range of about 20 to about 50 mm. As each center segment 22 radially expands, the gap between center segments increases. Provided within each center segment half 22a,b is a radially oriented piston chamber 28. Received in each chamber 28 is an elbow-shaped linkage 30 connected to an actuator 32, such as a piston 33. A control system (not shown) actuates the pistons 33, causing linkage 30 to slide from the retracted position shown in FIG. 3 to the actuated position shown in FIG. 4. When the linkages 30 are actuated, the linkages push the center segments radially outward into the high crown position as shown in FIG. 4.

Figure 12:
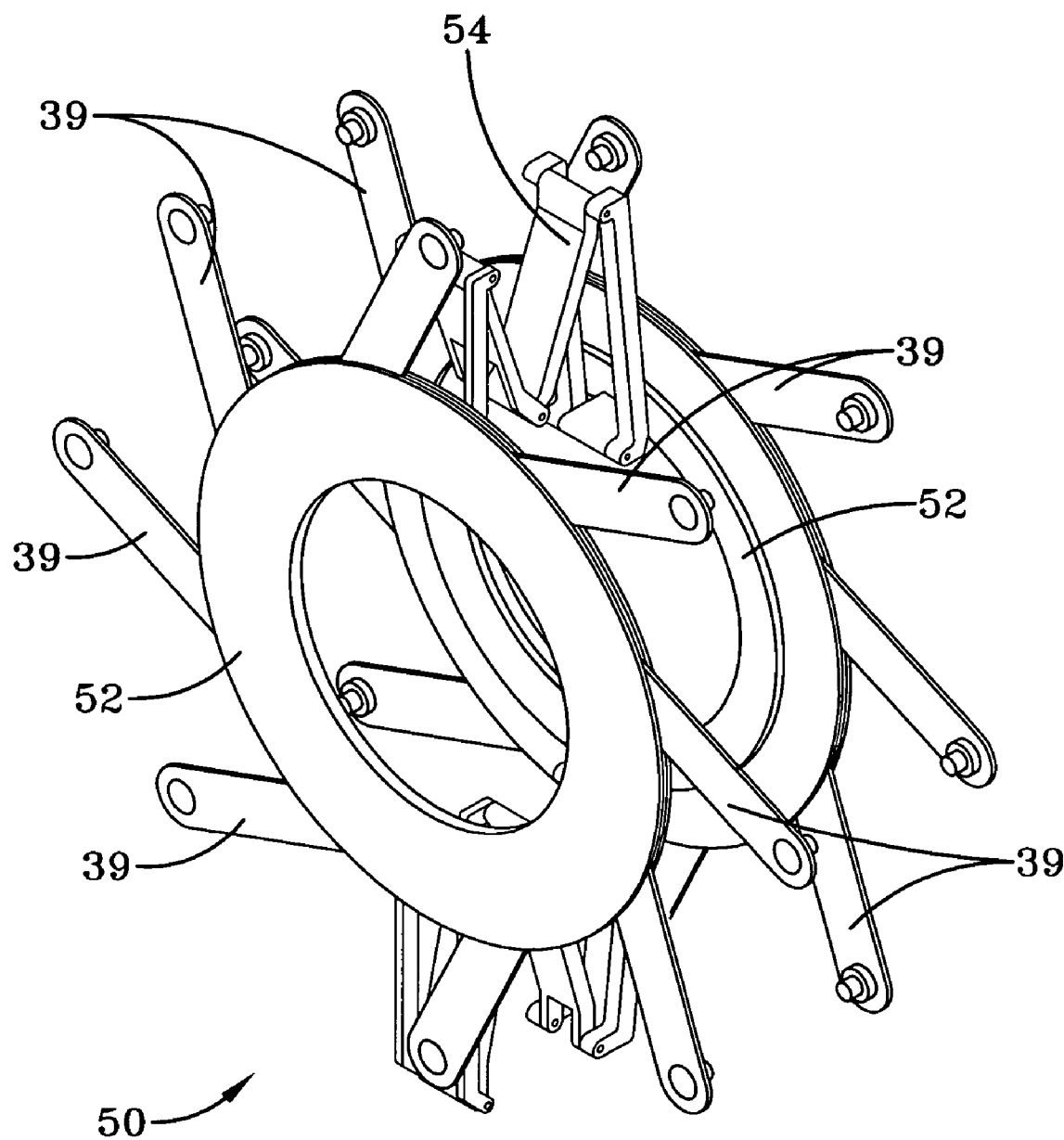
FIG. 12 is a perspective view of a synchronization mechanism for the tire building drum.
Figure 13A:
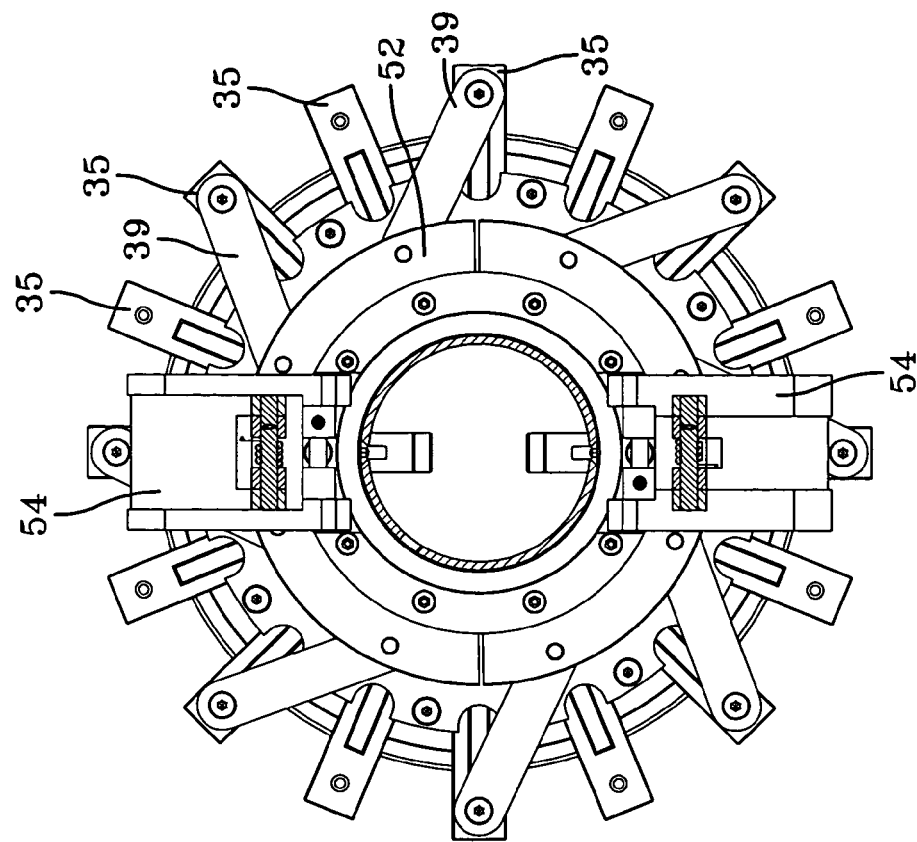
FIGS. 13A and 13B are cross sectional views of the tire building drum showing the center synchronization member and the center segment in the collapsed position and in the radially expanded position, respectively.
Figure 13B:
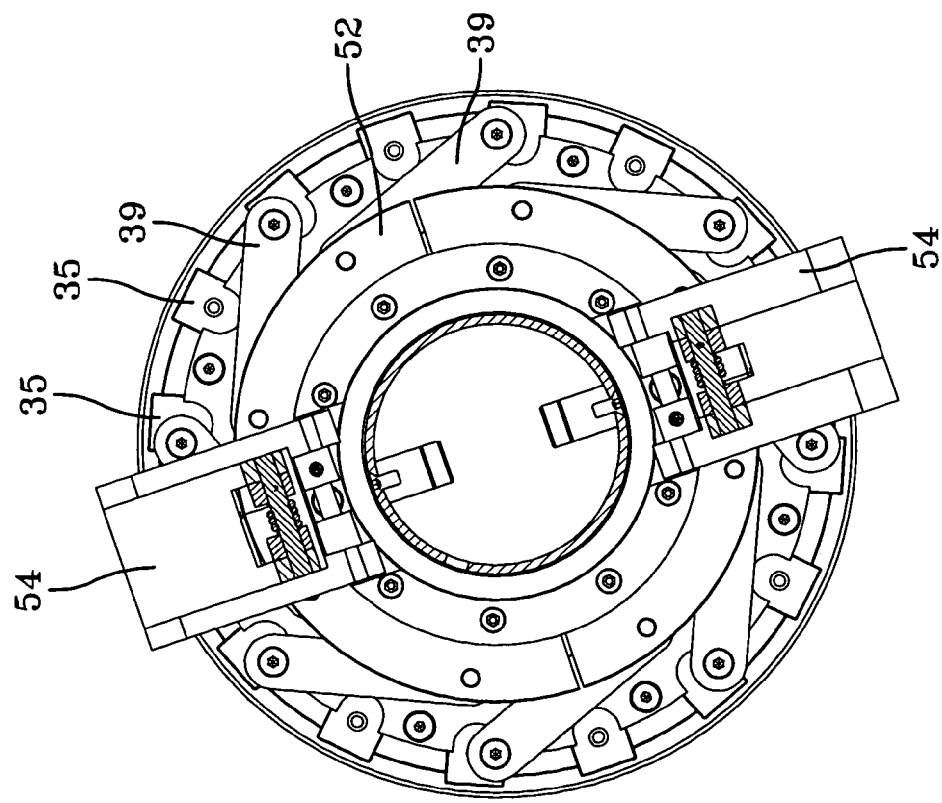

In order to ensure that the left hand side and right hand side of the center segments 22 move together in synchronization, a center synchronization mechanism 50 is provided, and is shown in FIG. 12. The center mechanism 50 includes two outer rings 52 joined together by a first and second linkage mechanism 54. The rings 52 are rotatably mounted in the tire building drum within the center segments 22. The linkage mechanisms 54 function to keep the outer rings 52 rotating in synchronization together. When linkages 30 are actuated to push the center section into the high crown position, the linkages 30 push up a plurality of lifter rods 35 through slots 37. The lifter rods 35 are connected to a plurality of support arms 39 which are connected to the outer rings 52. When the lifter rods 35 are actuated into their radially outer position, the support arms 39 are likewise actuated into their radially outer position, causing both of the center rings 52 to rotate. The connecting linkage 54 between the center rings 52 keeps the rings rotating in synchronization so that the left hand side and the right hand side of the center segments 22a,b move together when actuated in the radial direction. See FIGS. 13a and 13b and FIGS. 15-16.

Figure 9:
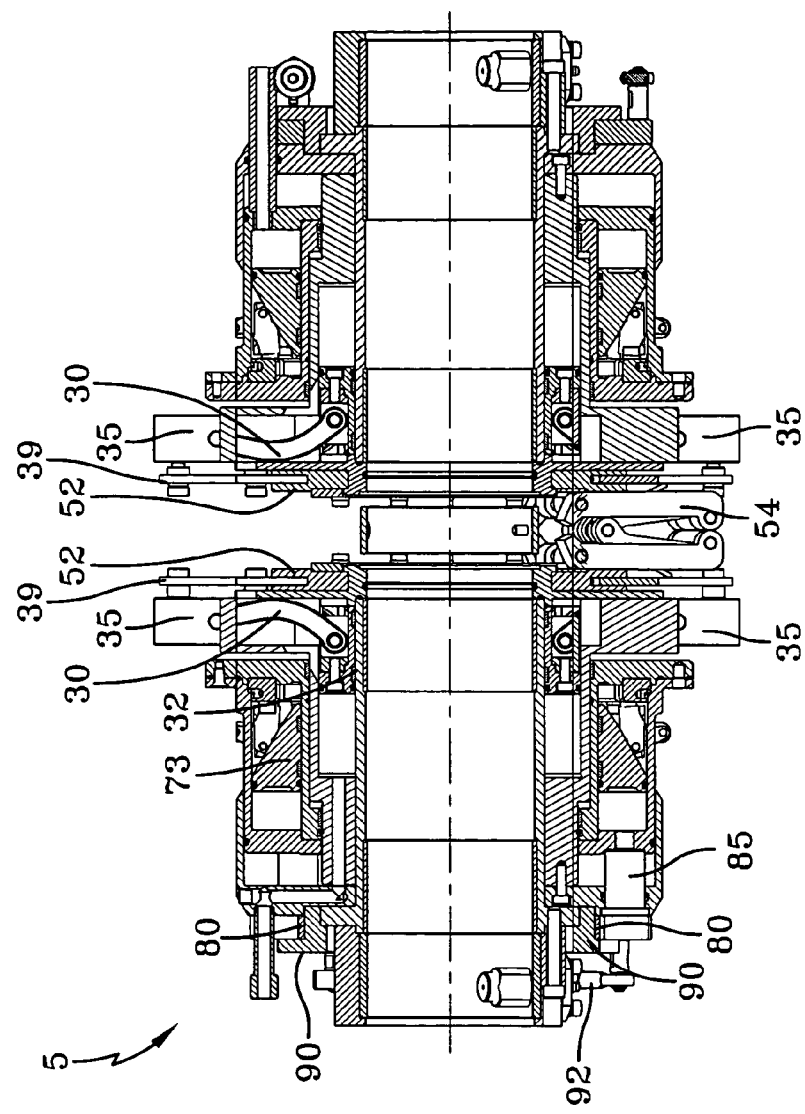
FIG. 9 is a cross sectional view of the tire building drum showing the stop pin locked in the inside position preventing shoulder axial movement.

The first and second linkage mechanisms 54 also allow the outer rings 52 to axially expand and contract. The linkages of the linkage mechanism 54 can fold up as shown in FIG. 9, enabling the center section of the tire building drum to have an axially smaller dimension. The linkages 54 may also outwardly expand, enabling the center section of the tire building drum to have an axially wider position. FIG. 4 illustrates the linkages in a partially expanded condition.

Figure 11:
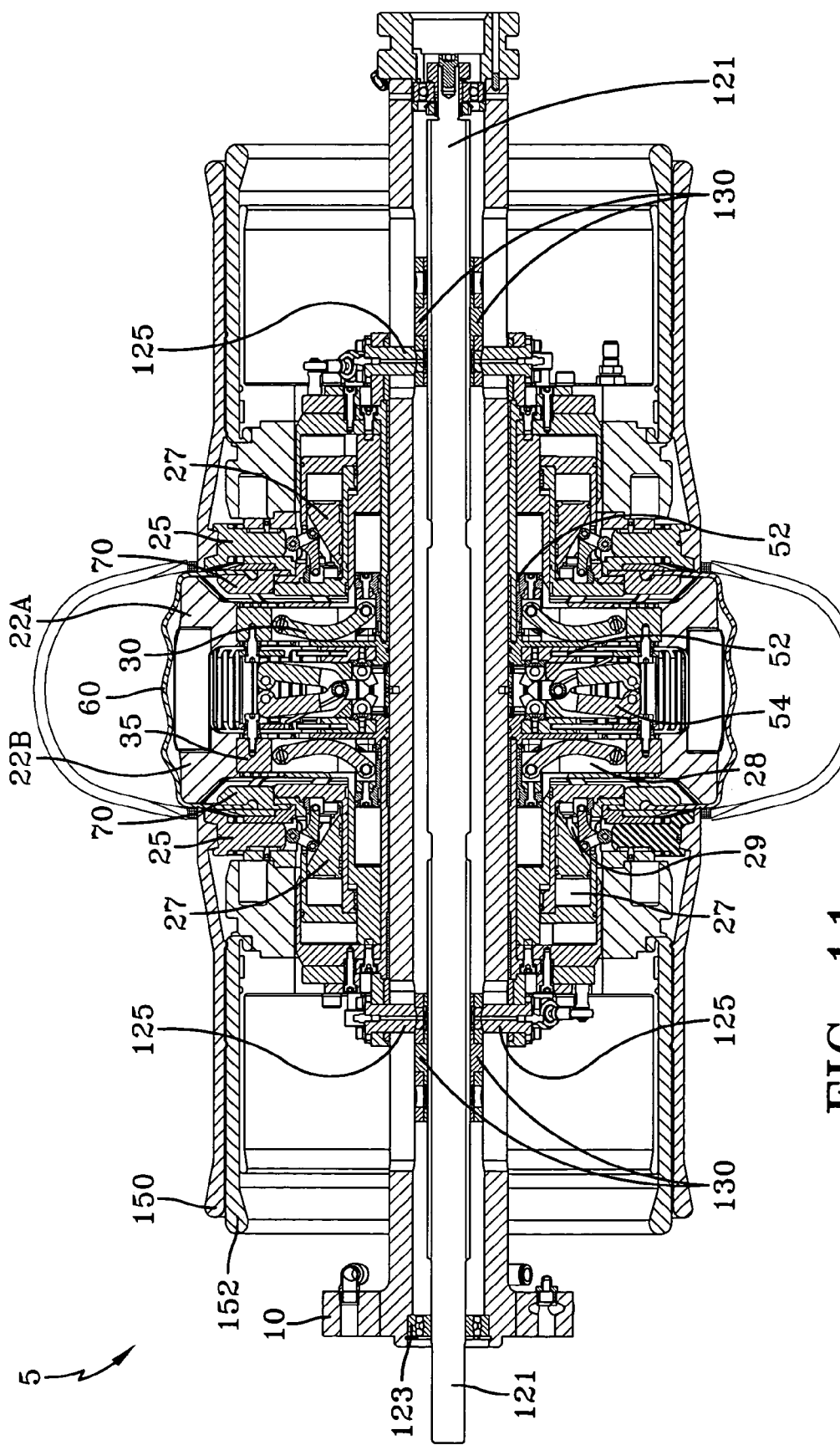
FIG. 11 is a cross sectional view of the tire building drum shown in the drum shaping position.

The exterior surface of the center section is covered by a sleeve 60 mounted thereon. Each end 62 of the sleeve 60 are secured in sleeve clamps 70 located adjacent the center section segments. The sleeve clamps 70 move axially inward during the center radial expansion into the high crown position, retarding motion of the center sleeve. This feature prevents the tire components from moving since the underlying sleeve does not move, resulting in better tire uniformity. The sleeve clamps 70 are actuated by pistons 72 controlled by the tire drum control (not shown). When the center section of the tire building drum is expanded radially outward into the high crown position, the sleeve clamp pistons 72 are actuated, resulting in the sleeve clamps 70 sliding axially into a recess 74 located between the bead lock mechanism and the center segments. This motion is coordinated in order to retard motion of the sleeve. Thus, the axial tension of the sleeve is maintained due to the actuation of the bead locks, as well as the ply and other tire components. However, the circumferential tension in the sleeve is higher over the high crown section. When the drum screws axially together during the shaping of the tire, the sleeve is no longer axially tensioned, and buckles up over the center section as shown in FIG. 11.

Bead Lock Mechanism

Figure 2:
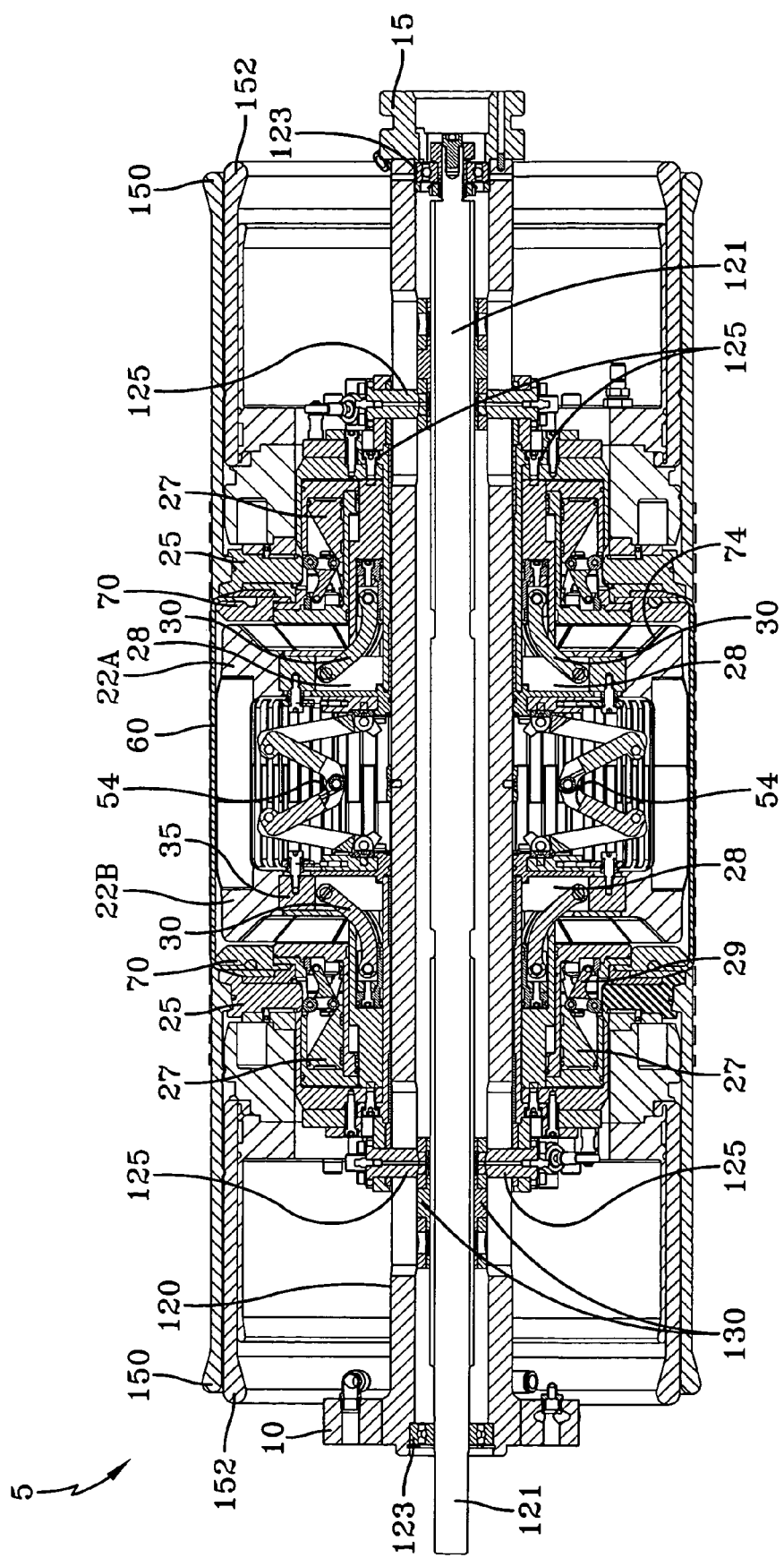
FIG. 2 is a cross-sectional view of the tire building drum shown in the start position.

Adjacent the center section 20 are first and second annular bead locking mechanisms 25. FIG. 2 illustrates the bead locking mechanisms 25 in the retracted position, while FIG. 3 illustrates the bead locking mechanisms 25 in the radially expanded or bead clamp position. The drum control system (not shown) actuates the bead lock pistons 27 into engagement with rocker arm 29 which engages an end of the bead lock mechanism, pushing the bead lock mechanism radially outward into the bead clamp position.

Figure 6:
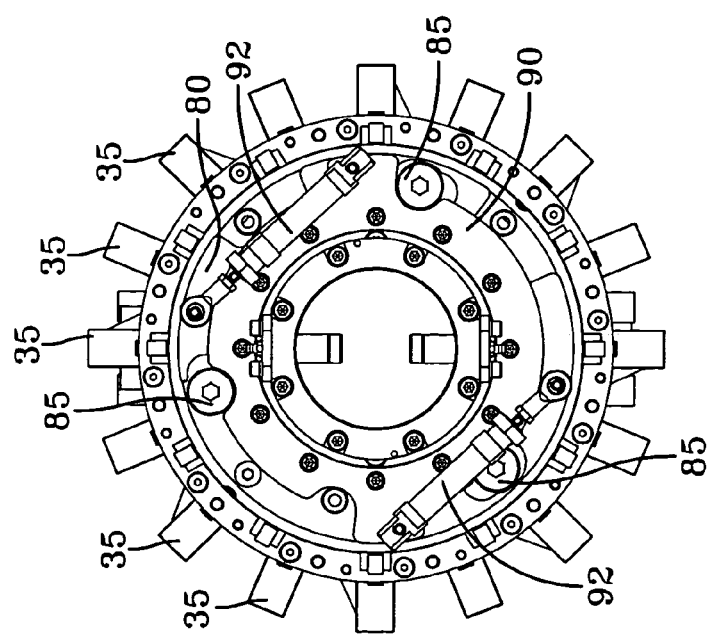
FIG. 6 is an end view of the tire building drum taken in the direction 6-6 of FIG. 5 showing the lock ring in the locked position.
Figure 7:
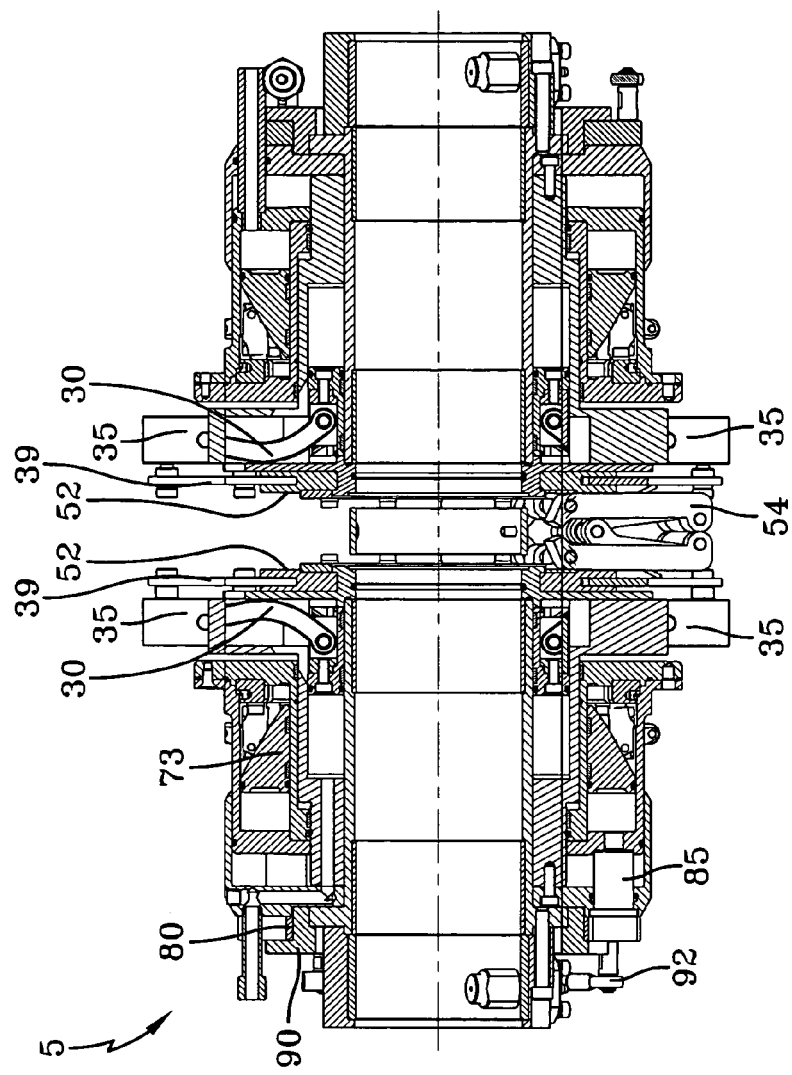
FIG. 7 is a cross sectional view of the tire building drum showing the stop pin unlocked.
Figure 8:
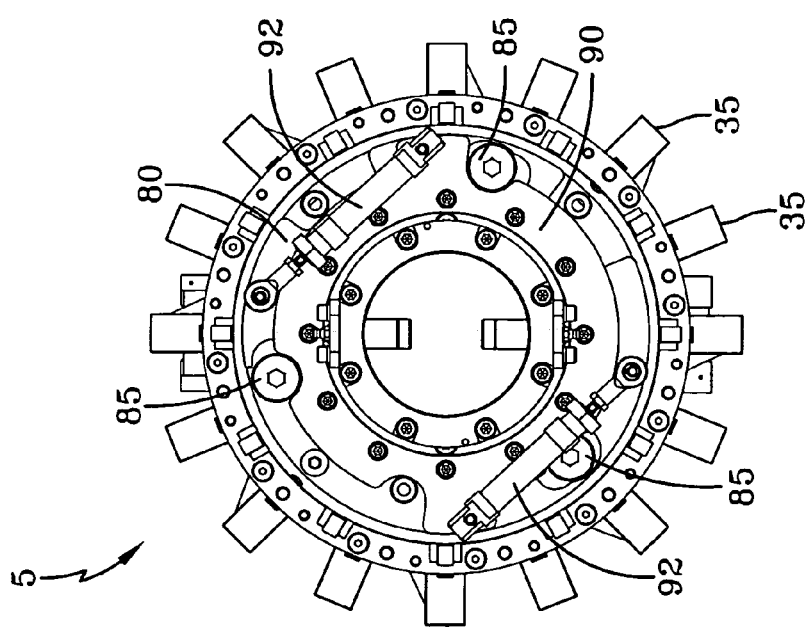
FIG. 8 is an end view of the tire building drum taken in the direction 8-8 of FIG. 7 showing the lock ring in the unlocked position.

The bead lock mechanisms are also independently axially movable, as described below. Further, the amount of axial movement of the bead lock mechanisms may be adjusted by the positioning of stop pin 85 shown in FIGS. 5 and 6.

Shoulder Section and Shoulder Clamp Lock

The right and left hand shoulder section 29 of the tire building drum 5 is defined as the drum components located axially outward of the centerline of the center section, inclusive of the sleeve clamps and the bead lock mechanisms. The left and right hand shoulder sections of the tire building drum are axially slidable on bearing sleeves. The shoulder sections 29 are actuated by drive pins 125 mounted on nuts 130, which ride along drive screw 121. When the central screw is rotated, the nuts 130 move axially inward/outward, causing the drive pins 125 and each shoulder section to move axially inward/outward in corresponding fashion. In addition, the drive pins are also in mechanical cooperation with the split center segments, causing the split center segments 22a,b to axially extend or contract.

When the center section 20 of the tire building drum 5 moves into the high crown position as shown in FIG. 4, the bead lock mechanisms 25 and the sleeve clamp mechanism 70 are further actuated axially inward by pistons 72,73 so that sleeve clamp is received in recess 74. The bead lock mechanisms and the sleeve clamps are actuated axially inward about the same axial distance as the radial distance traveled by the center segments 22 into the high crown position. The axial actuation of the bead lock mechanisms and sleeve clamps preferably occurs simultaneously with the movement of the center segments into the high crown position.

Figure 10:
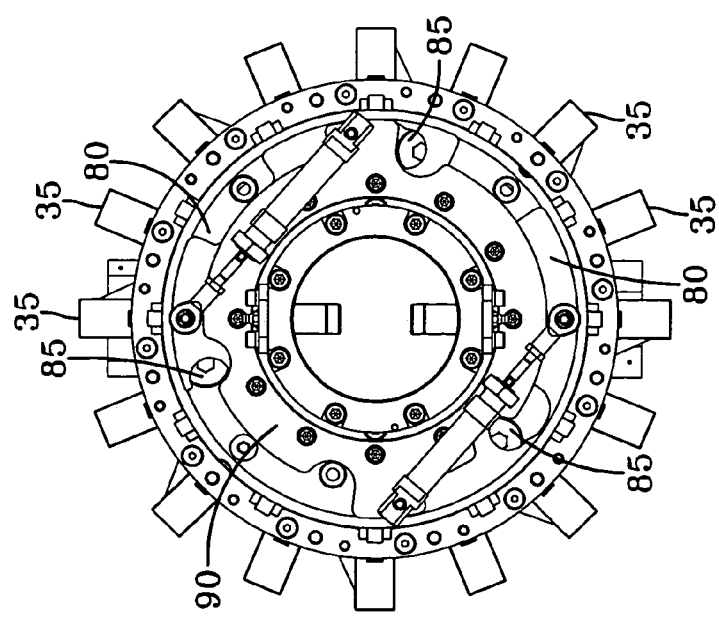
FIG. 10 is an end view of the tire building drum taken in the direction 10-10 of FIG. 9 showing the lock ring locking the stop pins in the inside position.

Because both shoulder sections 29 can move axially, it is important to secure the shoulder sections in place after the center section 25 of the tire drum has moved into the high crown position. In order to secure each shoulder section, a rotatable lock ring 80 mounted in each section of the shoulder section, locks one or more stop pins 85 in its outer position. When the stop pin is in its outer position, the shoulder section can move axially. See FIGS. 5 and 6. One or more actuators such as an air piston 92 actuate the rotatable lock ring 80. When the shoulder section is actuated to its axially inner position, stop pin 85 is also actuated or locked in its inner position as shown in FIGS. 9 and 10. Lock ring is rotated over the retracted stop pin openings, preventing the stop pin from moving. Since the stop pin cannot move, the shoulder sections which are engaged by the stop pin, are prevented from axially moving as well.

Drive Shaft

A central drive shaft 120 is provided for rotational movement of the tire building drum 5 about its longitudinal axis. The central shaft 120 is connected to a drive means (not shown). Provided within the central drive shaft 120 is a central screw 121. The central screw 121 is supported at each end by bearings 123. The threads on one side of the central screw 121 are left handed and on the opposite side are right handed. On the left hand side is an inboard nut 125 connected to the one end of the threaded screw 121 and similarly on the opposite right hand side is an outboard ball nut 125 connected to the central screw 121.

Turn Up Bladders

An upper bladder 150 extends axially outward from the bead lock mechanism 25 to the respective ends of the tire building drum. The upper bladder 150 extends over a lower bladder 152, which is mounted in the shoulder area of the drum and extends axially outward to the respective ends of the tire building drum. The upper and lower bladders function as turnup bladders which are used to inflate and, thereby, make the turn-up ends of the ply wrap about the apex and bead cores.

Method of Operation

The sequence of building an exemplary tire utilizing the tire drum of the present invention is explained below. The tire building can be fully automated or may require an operator to manually cut and splice the components as they are applied to the tire building drum 5. The components listed below can be varied for a particular tire construction. Some tires have more components than others. For example, some tires of the tube type may not require a liner.

First, the drum is set to the start position, as shown in FIGS. 1a and 1b. In the start position, the center section and shoulder sections are in their radially innermost positions, and the drum width is set to the start position. The start position width may very depending on the tire being manufactured. Next, the tire building components such as the tire liner, shoulder gum strips, chafers, sidewalls, optional run flat inserts, and ply are applied to the drum in successive order.

Each of the components described above requires, if applied separately, a rotation of the building drum 5 to form the component into a cylindrical shape. Alternatively, these components may be fed to the tire building drum 5 as one or more subassemblies. In either case, the ends of the components or subassemblies must be spliced together.

Next, the bead cores are positioned axially at a predetermined axial location generally above or slightly inward of the chafers but over the toe guard strip if used. Then, an apex filler strip would be placed with an end onto bead core and extending axially inwardly relative to the bead cores. Alternatively, the use of a preassembled bead-apex subassembly can be used. It is important to note that the tire building drum of the present invention can utilize beads of different diameters for the same tire.

The bead-apex subassembly is then pivoted into axially alignment with the axis of the tire building drum 5. Similarly, the bead loaders are positioned into axial alignment with the tire building drum 5. Once aligned, the bead loaders move axially inwardly over the bead core to position the bead-apex subassemblies 2 precisely onto the cylindrically-shaped carcass 10 over the bead lock mechanism of the tire building drum. The bead loader then releases the bead apex subassembly on the drum 5 while the drum bead lock mechanism radially expands, locking the bead cores into position. The bead lock mechanisms are actuated by the bead lock pistons 27, which contact rocker arm 29, pushing the bead lock mechanism radially outward into engagement with the bead or bead apex subassembly.

Next, the center of the drum expands into the high crown position as the shoulder segments move axially inward. The drum control system (not shown) actuates pistons 33, causing the linkages 30 to slide from the retracted position shown in FIG. 3 to the actuated position shown in FIG. 4. When the linkages 30 are actuated, the linkages push the center segments radially outward into the high crown position as shown in FIG. 4. When linkages 30 are actuated to push the center section into the high crown position, the linkages 30 push up a plurality of lifter rods 35 through slots 37. The lifter rods 35 are connected to a plurality of support arms 39 which are connected to the outer rings 52. When the lifter rods 35 are actuated into their radially outer position, the support arms 39 are likewise actuated into their radially outer position, causing both of the center rings 52 to rotate in the same direction. The connecting linkage 54 between the center rings 52 keeps the rings rotating in synchronization so that the left hand side and the right hand side of the center segments move together when actuated in the radial direction. See FIGS. 11a and 11b and FIGS. 13-14.

When the center of the drum expands into high crown position, the right and left hand shoulder sections move axially inwards until the sleeve clamps abut the crown pistons 28. Then the shoulder sections are locked into place when lock ring rotated by air pistons, entrapping the lock pins in their innermost position, preventing the shoulder sections from axially moving.

Next, the ply turnup ends can be folded over by actuating the inflatable turnup bladders at each inboard and outboard end of the building drum 5. The turnup bladders roll the carcass ply turnups and the sidewalls, if they have been previously attached, over onto the central support segments and carcass ply. As noted, the center segments radially typically expand approximately 30 millimeters above the initial start position. However, the amount of radial expansion may vary depending upon the tire size. It is desired to have a range of expansion from about 20 mm to about 50 mm. This permits the triangular shaped apex to be folded over at the tip or radial extremes, however, maintaining its vertical position or almost vertical position relative to the thickest or base portions of the apex nearest the bead cores 12. This greatly facilitates the construction of the carcass ply and ensures that the apexes are not overly distorted during the building process as is commonly done in the prior art method of assembling tire carcasses.

Once the tire turnup ends are folded over, the sidewalls can then either be applied or if previously applied, the entire assembly can then be stitched using roller mechanisms (not shown). The stitching procedure ensures that entrapped air is pushed outwardly of the carcass and that the components are firmly adhered to the adjacent underlying tire carcass components.

Once the stitching has been accomplished, the tire building drum axially contracts. The building drum 5 between the beads is charged with air or other fluid medium which passes through the central segment support mechanism and the radially expanded center segments to toroidally shape the tire carcass as illustrated in FIG. 11. When this is accomplished, the radially outer tip of the apex strip is moved back to its almost vertical position and the tire has been built in such a fashion that the carcass, particularly at the bead core area is not overly stressed. This high crown building drum 5, using the center segments, ensures that the carcass has at least partially vertically extending ply portions prior to the ends being turned up. This more closely assimilates the finished tire shape. Additionally, the movement radially outward of the central segments is about equal to the axial movement of the locked bead core on each side. This ensures that the amount of axial tension is controlled to the tire carcass each and every time it is toroidally inflated, greatly improving the reliability of the finished product.

Next, the tire-building drum is further moved axially inward, and the tread belt and reinforcing structure is applied to the carcass and then stitched. Next the shoulder clamp is actuated to the unlocked position, and the shoulder sections and the center section are moved radially inward to the start position of the drum. The green tire is then removed.

While certain representative embodiments and details have been shown for the purpose of illustrating the invention, it will be apparent to those skilled in this art that various changes and modifications may be made therein without departing from the spirit or scope of the invention.

What is claimed is:

1. A method of building a tire carcass on a tire building drum comprising the steps of:
    applying one or more tire building components onto a rotating drum to form a cylindrically shaped unvulcanized tire carcass having carcass ends; wherein said drum has a center section and a first and second shoulder section, said center section being radially expandable, said center section further comprising center segments having a first half and a second half, wherein the first half is connected to a first ring and the second half is joined to a second ring, wherein said first and second rings are rotatably mounted within the first half and second half, respectively; wherein the first and second rings are joined together by one or more linkages for maintaining the rotational synchronization of the first and second rings;
    placing a first and second bead around the tire building components on the drum so that the carcass ends of the tire carcass extend laterally between the beads;
    radially expanding a first and second bead lock mechanism into engagement with a first and second bead;
    moving the carcass located between the bead locks radially outward by radially expanding the center section of the tire building drum while moving the pair of bead lock mechanisms axially inward and while rotating said first and second rings together within the center segments, and maintaining the synchronization of the rotation of the rings by the one or more linkages.

2. The method of claim 1 further comprising the steps of turning up the tire carcass ends and stitching the turnups to form a partially radially extending turnup.

3. The method of claim 1 further comprises inflating through a central portion of the drum to toroidally shape the carcass.

4. The method of claim 1 wherein the step of moving the carcass radially outwardly between the bead locks includes moving the center segments a distance D, D being at least 20 mm.

5. The method of claim 3 wherein each of the bead lock mechanisms moves a distance axially inward about equal to the radial movement distance of the center segments.

6. The method of claim 1 wherein the carcass is mounted over a sleeve on the tire building drum, wherein the axial tension of the sleeve is maintained when a portion of the tire building drum is radially expanded.

7. The method of claim 1 wherein the axial tension of the carcass is maintained when a portion of the tire building drum is radially expanded.

8. The method of claim 3 wherein each of the bead lock mechanisms moves a distance axially inward slightly less than the radial movement of the center segments.

9. The method of claim 1 wherein the first half and the second half are axially movable with respect to each other so that the center section has an adjustable width, the method further comprising the step of axially contracting the center section of the tire building drum and then toroidally shaping the carcass.

10. The method of claim 1 wherein each of said shoulder sections is independently movable relative to the other shoulder section in the radial direction and the axial direction and adjusting the first and second beads to different diameters with respect to each other.

11. The method of claim 1 wherein the first and second bead lock mechanisms are actuated independently of each other.

12. The method of claim 1 wherein the first half and the second half each comprise plural chambers, each of said chambers having a first substantially radially oriented end and a second substantially axially oriented end; each chamber having an actuatable linkage disposed in said chamber, said linkage having a first end in communication with an actuator and a second end connected to one of said first and second halves, wherein actuation of the linkages from the axially oriented end to the radially oriented end of the chamber causes the expansion of the center section.

* * * * *